United States Patent

[11] 3,542,478

| [72] | Inventor | Benjamin Dessus<br>Paris, France |
|---|---|---|
| [21] | Appl. No. | 651,928 |
| [22] | Filed | July 7, 1967 |
| [45] | Patented | Nov. 24, 1970 |
| [73] | Assignee | Compagnie Generale D'Electricite<br>Paris, France |
| [32] | Priority | July 11, 1966 |
| [33] | | France |
| [31] | | No. 69,040 |

[54] LASER AUTOCOLLIMATOR
10 Claims, 1 Drawing Fig.

[52] U.S. Cl............................................. 356/153;
331/94.5
[51] Int. Cl...................................... G01b 11/27;
H01s 3/05
[50] Field of Search............................ 356/152,
153, 110, 112; 331/94.5

[56] References Cited
UNITED STATES PATENTS

| 3,096,767 | 7/1963 | Gresser et al. | 331/94.5 |
| 3,369,101 | 2/1968 | Di Curcio | 331/94.5 |
| 3,392,258 | 7/1968 | Bruma et al. | 331/94.5 |
| 3,432,240 | 3/1969 | Jackson | 356/152 |
| 3,356,438 | 12/1967 | Macek et al. | 331/94.5 |
| 3,397,608 | 8/1968 | Ellis | 356/116 |
| 3,401,590 | 9/1968 | Massey | 356/114 |
| 3,470,377 | 9/1969 | Le Febre et al. | 356/138 |

*Primary Examiner*—Ronald L. Wibert
*Assistant Examiner*—J. Rothenberg
*Attorney*—Cushman, Darby & Cushman

ABSTRACT: Autocollimating setup wherein an optical device bringing about both transmission and deviation has a face common with an optical cavity containing a laser tube and another face common with an ocular.

Patented Nov. 24, 1970 3,542,478
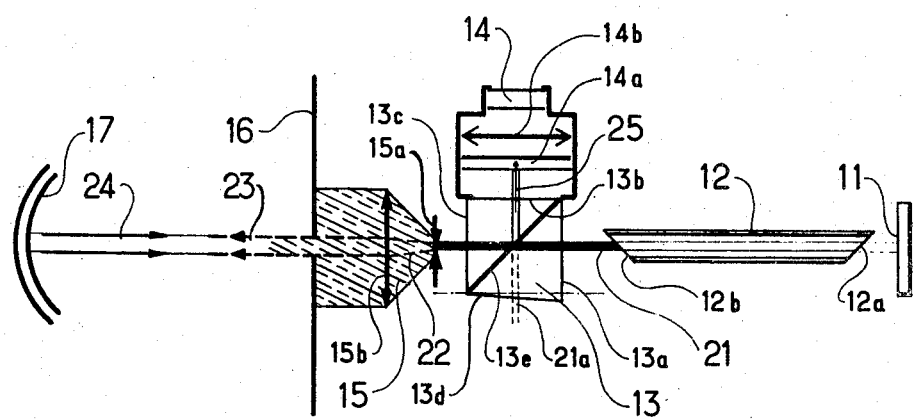

LASER AUTOCOLLIMATOR

The present invention has as its object a self-collimating laser, that is to sa one equipped with an optical self-collimating device intended to replace a conventional self-collimating glass.

In order to adjust the position of a mirror for example, it is known that an autocollimation glass may be employed, which on receiving a beam of visible light at a so-called input "pupil", renders the same parallel with an excellent approximation, with a divergence of 20 seconds of arc for example, and causes it to traverse a semitransmissive and semideviating element, for example a biprism intersected by a diagonal plane and reglued by means of Canada balsam, the beam transmitted being reflected into the prism which reflects the laterally received beam into an eyepiece which may for example comprise a reticule: if the adjustment is correct, a spot of light centered on the intersection of the hairs is visible in the eyepiece.

A device of this nature is employed in particular for the adjustment of the mirrors of laser tubes.

A primary disadvantage of the known device is that, in the normal operating conditions, the light beam directed towards the element to be adjusted is of inadequate intensity to be visible in daylight, the power being several tens of microwatts, so that the operation must be performed in darkness, which represents a considerable hindrance.

The invention has as its object an autocollimation device providing a much more powerful beam, such that adjustments may be made in full daylight.

This is realized according to the invention, by providing a self-collimating arrangement in which optical means of combined transmission and lateral deflection are coordinated by one surface with an optical cavity containing a laser tube and by another surface with an eyepiece. A gas He-Ne laser providing a red line of a wavelength of 6328 A. will advantageously be considered.

Instead of assembling the apparatus from two subaggregates such as source of light on the one hand, and autocollimation glass on the other hand, it is specified according to the invention to form the structure of a biprism which is cut, glued together again, and coordinated with an eyepiece equipped with a reticule, which forms part of an optical cavity coordinated with a laser tube.

The advantages of an arrangement of this kind are manifold. For instance a light beam of considerably increased power is obtained, e.g. of the order of several milliwatts. Also the optical system may be simplified, and this for two reasons: a. the primary beam inherently being of very small divergence, for example of the order of $10^{-3}$ radian, it is very easy and inexpensive to covert the same into a beam having a divergence of $10^{-4}$ radian, that is to say approximately 20 seconds of arc. b. chromatic aberration need not be feared, since the beam is quasimonochromatic.

The invention will be described in greater detail with reference to the accompanying drawing, showing a diagrammatical view of the arrangement according to the invention, but in no restrictive sense.

The arrangement comprises a laser tube 12, for example containing an He-Ne mixture, situated between a reflecting mirror 11 and a biprism 13. An eyepiece 14 positioned laterally behind a focusing lens 14bis coordinated with one of the surfaces of the biprism 13.

An optical system 15, comprising divergent and convergent lenses 15a and 15b, and preferably also a diaphragm 16, is situated at the side of the biprism remote from the tube 12.

One face 13a of the biprism, provided with multidielectric layers forms an optical cavity with the mirror 11 (after the manner of a Perot-Fabry interferometer). The tube 12, connected to a source of electrical excitation which is not illustrated, by two connections 12a and 12b, generates in these conditions a beam of coherent visible light 21 of low divergence, for example amounting to $10^{-3}$ radian. A part 21a of the incident light is lost.

The faces 13b and 13c of the biprism 13 are coated with antireflection layers. The face 13d slopes to prevent any undesirable reflection of the part 21a from shining an interference spot into the eyepiece 14.

The beam 21 is widened and rendered less divergent, to an angle of divergence of $10^{-4}$ radian, or approximately 20 seconds of arc, by means of the optical system 15. The central part may be isolated by means of the diaphragm 16. The widened beam indicated at 23 is aimed at an element 17 which is to be adjusted, and which reflects a beam 24.

This beam 24 traverses the optical system 15 in the opposite direction and is converted on the diagonal 13e of the biprism into a laterally deflected beam 25 which is received by the eyepiece 14. A part of the beam 24 traverses the biprism 13 in the axial direction and is lost, as is normal in autocollimation devices.

The eyepiece 14 comprises an absorption screen 14a in order to protect the eye of the observer against glare caused by the great intensity of the beam.

The preceding form of embodiment is given by way of example only, numerous modifications being possible within the scope of the invention. In particular, autocollimation by coincidence of light spots may be employed instead of an eyepiece equipped with a reticule.

I claim:

1. An autocollimating device for determining the relation between an emerging incident laser beam and an externally reflected portion of that beam comprising:
   an optical resonant cavity including a laser tube;
   a transparent beam splitter including:
   a first face having means forming part of said optical resonant laser cavity for transmitting said laser beam perpendicularly through the face;
   a second face having optical properties and a physical position such that it is at least partially transparent for passing the beam from the first face and at least partially reflecting for redirecting the said externally reflected laser beam;
   a third face for receiving and passing the redirected beam from the second face; and
   a reference reticule disposed adjacent the third face for comparing therewith the position at which the laser beam strikes the third face to provide a measure of the collimation between the aforesaid beam passed by said second face and the externally reflected beam received by said second face.

2. A device as in claim 1 including a transparent block having adjacent sides forming said first and third faces, said second face being formed by a plane extending through the line of intersection of the first and third faces.

3. A device as in claim 2 wherein said block includes four flat block surfaces, a first block surface providing said first face and disposed parallel to an opposite second block surface, and a third block surface providing said third face and disposed at an angle to an opposite fourth block surface.

4. A device as in claim 2 wherein said block includes a biprism of generally cubical shape formed by two triangular prisms cemented together along their hypotenuse sides to provide said second face.

5. A device as in claim 3 wherein said second and third block surfaces are coated with antireflection layers.

6. A device as defined in claim 1 wherein the second face extends at substantially 45° with respect to the other two faces.

7. A device as in claim 1 wherein said means forming part of an optical resonant laser cavity is comprised of multiple dielectric layers on said first face.

8. A device as in claim 1 including optical means for improving the parallelism of said emerging incident laser beam.

9. A device as in claim 8 wherein said optical means is comprised of at least one divergent lens and at least one convergent lens.

10. A device for observing the directional relation between an incident beam and a reflected beam of light, said device comprising:
- a beam separating element which passes a substantial portion of the incident beam without directional charge but which redirects, at an angle, a substantial portion of the reflected beam;
- a laser source for the incident beam including an optical resonant laser cavity formed at least in part by a dielectric coated surface of said beam separating element and a laser tube;
- optical means comprising at least one diverging and one converging lens for improving the parallelism of the incident beam after passage by the beam separating element;
- an adjustable external system for receiving the incident beam from the optical means and reflecting that beam back to the beam separating element; and
- a reticule mounted on a surface of the beam separating element and designed to receive the redirected reflected beam and, by its relative position on the reticule, indicate the directional relation between the incident and reflected beams.